(12) United States Patent
Fu et al.

(10) Patent No.: US 12,294,064 B2
(45) Date of Patent: May 6, 2025

(54) RECHARGEABLE BATTERY MONITORING SYSTEM, BATTERY PACK AND ELECTRIC VEHICLE

(71) Applicant: CONTEMPORARY AMPEREX TECHNOLOGY (HONG KONG) LIMITED, Hong Kong (CN)

(72) Inventors: Yanhui Fu, Ningde (CN); Le Chu, Ningde (CN); Zhongliang Guo, Ningde (CN); Qiandeng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 969 days.

(21) Appl. No.: 17/123,017

(22) Filed: Dec. 15, 2020

(65) Prior Publication Data

US 2021/0104781 A1 Apr. 8, 2021

Related U.S. Application Data

(63) Continuation of application No. PCT/CN2020/072660, filed on Jan. 17, 2020.

(30) Foreign Application Priority Data

Jan. 18, 2019 (CN) .......................... 201910083091.2

(51) Int. Cl.
  *H01M 10/42* (2006.01)
  *H01M 10/48* (2006.01)
  (Continued)

(52) U.S. Cl.
  CPC ..... *H01M 10/4257* (2013.01); *H01M 10/482* (2013.01); *H01M 50/204* (2021.01);
  (Continued)

(58) Field of Classification Search
  CPC ........... H01M 10/4257; H01M 10/482; H01M 50/249; H01M 50/204; H01M 2010/4271;
  (Continued)

(56) References Cited

U.S. PATENT DOCUMENTS 8,908,779 B2   12/2014   Douglass
2015/0236529 A1   8/2015   Tanaka et al.
(Continued)

FOREIGN PATENT DOCUMENTS

CN   103299652 A   7/2012
CN   103270666 A * 8/2013 ........ H01M 10/4207
(Continued)

OTHER PUBLICATIONS

Ningder Age New Energy Technology Co. Ltd., First Office Action, CN201910083091.2, Jul. 24, 2020, 14 pgs.
(Continued)

*Primary Examiner* — Jimmy Vo
(74) *Attorney, Agent, or Firm* — K&L Gates LLP

(57) ABSTRACT

This application relate to a rechargeable battery monitoring system, a battery pack, and an electric vehicle. A rechargeable battery includes battery units and an MSD switch. The battery units are serially-connected, and the MSD switch is connected between adjacent battery units. The monitoring system includes a BMU and an equal number of CMCs that have one-to-one correspondence with the battery units. The CMCs are divided into CMC groups that meet preset conditions. The monitoring system further includes an equal number of daisy chain buses that are in one-to-one correspondence with the CMC groups. Each CMC group is connected to the BMU through one daisy chain bus. This embodiment helps a battery pack and an electric vehicle to avoid damage caused by a chip on the CMC in a process of plugging or unplugging the MSD switch, and help the CMC (Continued)

accurately monitor the battery units in the rechargeable battery.

19 Claims, 8 Drawing Sheets

(51) Int. Cl.
  *H01M 50/204* (2021.01)
  *H01M 50/249* (2021.01)
  *H02J 7/00* (2006.01)

(52) U.S. Cl.
  CPC ......... *H01M 50/249* (2021.01); *H02J 7/0013* (2013.01); *H02J 7/0047* (2013.01); *H01M 2010/4271* (2013.01); *H01M 2010/4278* (2013.01); *H01M 2220/20* (2013.01)

(58) Field of Classification Search
  CPC ....... H01M 2010/4278; H01M 2220/20; H02J 7/0013; H02J 7/0047
  See application file for complete search history.

(56) References Cited

U.S. PATENT DOCUMENTS

| | | | |
|---|---|---|---|
| 2017/0062876 A1* | 3/2017 | Narla | .................... B60L 3/0046 |
| 2018/0372804 A1 | 12/2018 | Yamazaki et al. | |

FOREIGN PATENT DOCUMENTS

| | | | | |
|---|---|---|---|---|
| CN | 103329563 A | | 9/2013 | |
| CN | 103728568 A | | 4/2014 | |
| CN | 105723559 A | * | 6/2016 | ............. B60L 50/51 |
| CN | 206178019 U | | 5/2017 | |
| CN | 207449644 U | | 6/2018 | |
| CN | 108544932 A | | 9/2018 | |
| JP | 5717599 B2 | | 5/2015 | |

OTHER PUBLICATIONS

Contemporary Amperex Technology Co. Limited, Extended European Search Report, EP20742098.5, Aug. 4, 2021, 7 pgs.
Contemporary Amperex Technology Co. Limited, International Search Report and Written Opinion, PCT/CN2020072660, Apr. 15, 2020, 13 pgs.

* cited by examiner ially-connected, and the MSD switch is connected between two adjacent battery units. The monitoring system includes a battery management unit (BMU) and multiple cell monitoring circuits (CMCs). The CMCs, in number, are equal to the battery units and are one to one connected to the battery units. The CMCs are divided into multiple CMC groups that meet preset conditions. The monitoring system further includes multiple daisy chain buses. The CMC groups, in number, are equal to the daisy chain buses and are in a one-to-one correspondence with the daisy chain buses. Each CMC group is communicatively connected to the BMU through one daisy chain bus. The preset conditions are: the battery units corresponding to the CMCs in each CMC group are serially-connected to form a battery unit group corresponding to the CMC group, and the MSD switch is connected between two adjacent battery unit groups.

RECHARGEABLE BATTERY MONITORING SYSTEM, BATTERY PACK AND ELECTRIC VEHICLE

CROSS REFERENCE TO RELATED APPLICATIONS

This application is a continuation application of PCT Patent Application No. PCT/CN2020/072660, entitled "STORAGE BATTERY MONITORING SYSTEM, BATTERY PACK, AND ELECTRIC VEHICLE" filed on Jan. 17, 2020 which claims priority to Chinese Patent Application No. 201910083091.2, filed with the State Intellectual Property Office of the People's Republic of China on Jan. 18, 2019, and entitled "RECHARGEABLE BATTERY MONITORING SYSTEM, BATTERY PACK AND ELECTRIC VEHICLE", all of which are incorporated herein by reference in their entirety.

TECHNICAL FIELD

Embodiments of this application relate to the field of battery monitoring, and in particular, to a rechargeable battery monitoring system, a battery pack, and an electric vehicle.

BACKGROUND

Electric vehicles in place of fuel vehicles have become a development trend of the automotive industry. Safety of power batteries of an electric vehicle has always been a top concern in the industry, and a high-voltage circuit of the electric vehicle is critical to safe operation of the vehicle. A battery pack of the electric vehicle primarily uses a lithium-ion battery or the like as a rechargeable battery, and a large quantity of battery units are serially-connected to form a power battery pack. To ensure driving safety, parameters such as a voltage and a temperature of the battery units in the rechargeable battery of the electric vehicle need to be monitored in a driving process to collect operating data such as the voltage and temperature of the battery units. To ensure accuracy of the collected data, the parameters such as the voltage and temperature of the battery units in the power battery pack formed by the serial connection are generally monitored by a cell monitoring circuit ("CMC" for short). To ensure safe disconnection of the high-voltage circuit, a manual service disconnect ("MSD" for short) switch is added between the interconnected battery units.

However, it is found that at least the following problems exist in the prior art: a surge voltage is generated in a process of plugging and unplugging the MSD switch, and the generated surge voltage may damage a chip on the CMC, make the CMC unable to accurately monitor the battery units in the rechargeable battery, and even lead to a crash of an entire communication link.

SUMMARY

An objective of embodiments of this application is to provide a rechargeable battery monitoring system, a battery pack, and an electric vehicle to avoid damage that may be caused to a chip on a CMC in a process of plugging or unplugging an MSD switch, help the CMC accurately monitor battery units in a rechargeable battery, and ensure normal operation of an entire communication link.

To solve the above technical issues, an embodiment of this application provides a rechargeable battery monitoring system. A rechargeable battery in the rechargeable battery monitoring system includes multiple battery units and at least one Manual Service Disconnect (MSD) switch. The multiple battery units are serially-connected, and the MSD switch is connected between two adjacent battery units. The monitoring system includes a battery management unit (BMU) and multiple cell monitoring circuits (CMCs). The CMCs, in number, are equal to the battery units and are one to one connected to the battery units. The CMCs are divided into multiple CMC groups that meet preset conditions. The monitoring system further includes multiple daisy chain buses. The CMC groups, in number, are equal to the daisy chain buses and are in a one-to-one correspondence with the daisy chain buses. Each CMC group is communicatively connected to the BMU through one daisy chain bus. The preset conditions are: the battery units corresponding to the CMCs in each CMC group are serially-connected to form a battery unit group corresponding to the CMC group, and the MSD switch is connected between two adjacent battery unit groups.

An embodiment of this application further provides a battery pack, including a rechargeable battery and the rechargeable battery monitoring system.

An embodiment of this application further provides an electric vehicle, including the battery pack.

In some embodiments, the CMCs are divided into multiple CMC groups that meet preset conditions. The monitoring system further includes multiple daisy chain buses. The CMC groups, in number, are equal to the daisy chain buses and are in a one-to-one correspondence with the daisy chain buses. Each CMC group is communicatively connected to the BMU through one daisy chain bus. The preset conditions are: the battery units corresponding to the CMCs in each CMC group are serially-connected to form a battery unit group corresponding to the CMC group, and the MSD switch is connected between two adjacent battery unit groups. Single-chain communication between the CMC and the BMU is replaced by multi-chain communication, and each of the plurality of CMC groups is communicatively connected to the BMU through an independent daisy chain bus. Therefore, there is no connection relationship between the CMC groups. By using this circuit connection method, no circuit is formed at a moment of plugging or unplugging the MSD switch, and no surge voltage is generated, so as to avoid damage that may be caused to a chip on a CMC in a process of plugging or unplugging the MSD switch, help the CMC accurately monitor the battery units in the rechargeable battery, and ensure normal operation of an entire communication link.

In addition, a quantity of the CMC groups is one more than a quantity of the MSD switches. This embodiment provides a specific implementation of the monitoring system. In this embodiment, the CMCs are divided into a least number of groups, and a circuit structure is simplified as far as possible while meeting safety requirements.

A battery unit group connected to the MSD switch is referred to as a first battery unit group, a CMC group corresponding to the first battery unit group is referred to as a first CMC group, and a CMC corresponding to a battery unit connected to the MSD switch in the first battery unit group is referred to as a first CMC. In the first CMC group, voltage isolation is implemented between the first CMC and a CMC adjacent thereto through an isolation transformer. In this embodiment, the isolation transformer is disposed between the first CMC and the adjacent CMC to further avoid damage that may be caused to the chip on the CMC due to a surge voltage in a process of plugging or unplugging the MSD switch.

In addition, in each CMC group, voltage isolation is implemented between two adjacent CMCs by the isolation transformer. In this embodiment, the isolation transformer is disposed between every two adjacent CMCs to implement voltage isolation, thereby further avoiding damage that may be caused to the chip on the CMC due to a surge voltage in a process of plugging or unplugging the MSD switch.

In addition, a lowest-potential CMC in one of the two CMC groups is directly connected to the BMU, and a highest-potential CMC in the other CMC group is directly connected to the BMU. This connection manner facilitates layout and installation of the battery units and wire harnesses in the battery pack, and shortens connection lines between the battery units.

DESCRIPTION OF DRAWINGS

One or more embodiments are described exemplarily with reference to accompanying drawings corresponding to the embodiments. The exemplary description shall not constitute any limitation on the embodiments. Components labeled with the same reference numeral in the accompanying drawings represent similar components. Unless otherwise specified, the accompanying drawings are not subject to a scale limitation.

DESCRIPTION OF EMBODIMENTS

To make the objectives, technical solutions, and advantages of this application clearer, the following describes the embodiments of this application in detail with reference to accompanying drawings. A person of ordinary skill in the art understands that in each embodiment of this application, many technical details are provided to make readers better understand this application. However, the technical solutions claimed in this application can still be implemented even without the technical details and without making variations and modifications based on the following embodiments.

Figure 1:
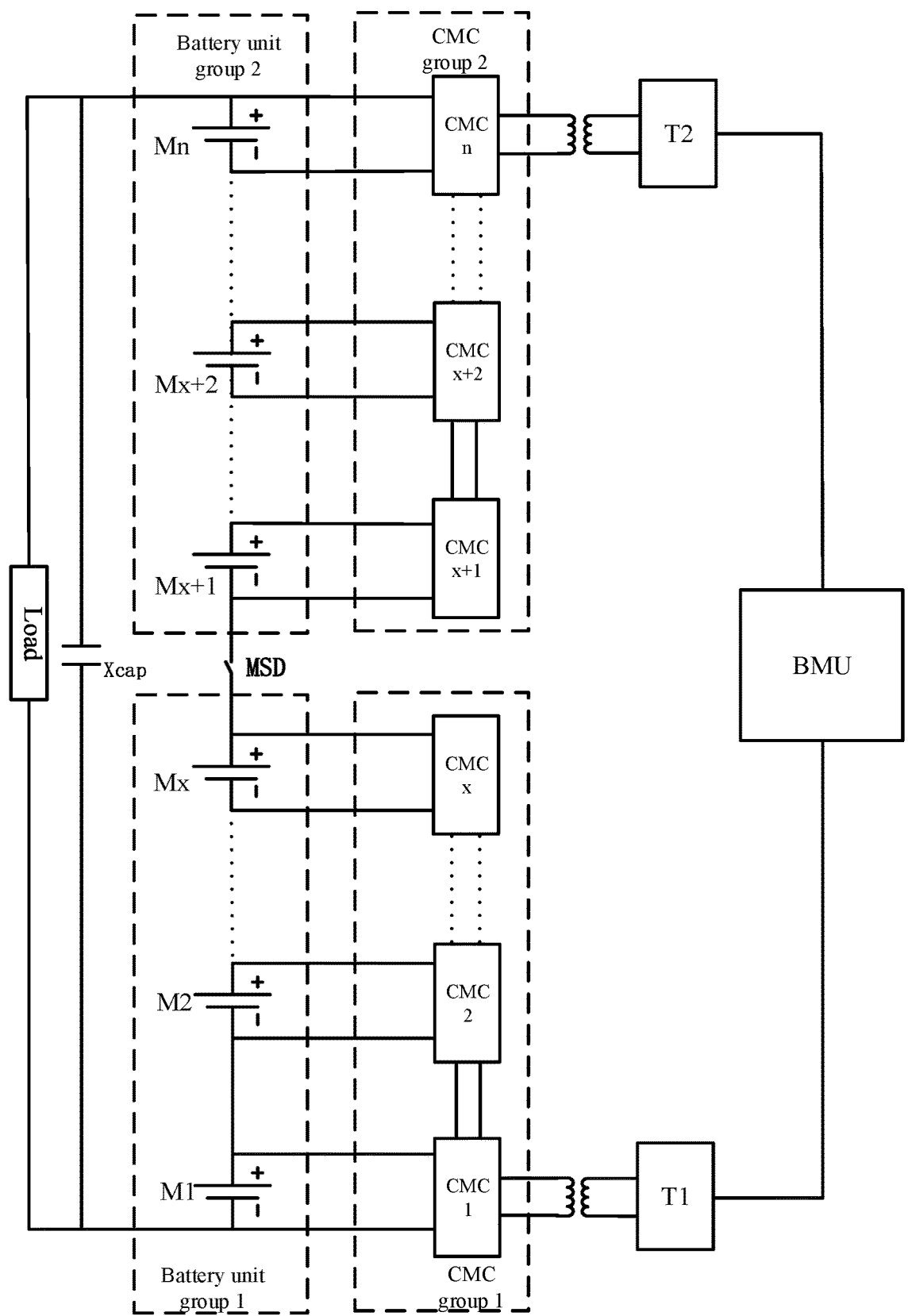
FIG. 1 is a schematic structural diagram of an example of a rechargeable battery monitoring system according to a first embodiment of this application.

A first embodiment of this application relates to a rechargeable battery monitoring system, as shown in FIG. 1. A rechargeable battery includes n battery units and at least one Manual Service Disconnect (MSD) switch. The n battery units are serially-connected, and the MSD switch is connected between two adjacent battery units. The monitoring system includes a battery management unit (battery management unit, "BMU" for short) and n cell monitoring circuits (CMCs). The CMCs, in number, are equal to the battery units and are one-to-one connected to the battery units. The CMCs are divided into multiple CMC groups that meet preset conditions. The monitoring system further includes multiple daisy chain buses. The CMC groups, in number, are equal to the daisy chain buses and in a one-to-one correspondence with the daisy chain buses. Each CMC group is communicatively connected to the BMU through one daisy chain bus. The preset conditions are: the battery units corresponding to the CMCs in each CMC group are serially-connected to form a battery unit group corresponding to the CMC group, and the MSD switch is connected between two adjacent battery unit groups.

As compared with the prior art, in the embodiment of this application, single-chain communication between the CMC and the BMU is replaced by multi-chain communication, and each of the plurality of CMC groups is communicatively connected to the BMU through an independent daisy chain bus. Therefore, there is no connection relationship between the CMC groups. By using this circuit connection method, no circuit is formed at a moment of plugging or unplugging the MSD switch, and no surge voltage is generated, so as to avoid damage that may be caused to a chip on a CMC in a process of plugging or unplugging the MSD switch, help the CMC accurately monitor the battery units in the rechargeable battery, and ensure normal operation of an entire communication link.

The following describes details of implementation of the rechargeable battery monitoring system according to this embodiment. The following content of detailed implementation is provided for ease of understanding only, but not necessary for implementing this solution.

As shown in FIG. 1, a rechargeable battery includes n serially-connected battery units, where the value of n may be set according to actual conditions. The connections are from M1 to Mx, and from Mx+1 to Mn. Potentials of the n serially-connected battery units increase from M1 to Mn consecutively. Two battery units at two ends are a highest-potential battery unit and a lowest-potential battery unit of the rechargeable battery respectively. In FIG. 1, M1 is the lowest-potential battery unit, and Mn is the highest-potential battery unit of the rechargeable battery. However, without being limited thereto, in other examples, M1 may be the highest-potential battery unit, and Mn may be the lowest-potential battery unit. Xcap represents an equivalent capacitance of the battery pack or an entire vehicle system, with the rechargeable battery being disposed in the battery pack. The rechargeable battery is connected to a load, and the rechargeable battery is configured to power the load (such as an electric vehicle).

The rechargeable battery further includes at least one Manual Service Disconnect (MSD) switch. In the example shown in FIG. 1, the rechargeable battery includes only one MSD switch. The MSD switch is disposed between adjacent Mx and Mx+1 to ensure safe disconnection of a high-voltage circuit between the rechargeable battery and the load, where x is an integer greater than 1 and less than n, and the value of x may be set as required. Specifically, the MSD may be inserted between any two adjacent battery units among the n battery units. In this embodiment, the n battery units are divided into two battery unit groups. M1~Mx are a battery unit group, referred to as a battery unit group 1; Mx+1~Mn are another battery unit group, referred to as a battery unit group 2. In other words, in this embodiment, the quantity of the battery unit groups is one more than the quantity of MSD switches. It needs to be noted that this embodiment does not limit the quantity of MSD switches. In practical applications, if the rechargeable battery includes many battery units and the rechargeable battery is safety-demanding, the rechargeable battery may also include a plurality of MSD switches, and each MSD is connected between any two adjacent battery units among the n battery units. In this case, the quantity of battery unit groups depends on the quantity of MSD switches. For example, when the quantity of MSD switches is 2, the quantity of battery unit groups may be 3; when the quantity of MSD switches is 3, the quantity of battery unit groups may be 4. Therefore, in this embodiment, the quantity of the battery unit groups is one more than the quantity of the MSD switches.

The n CMCs are CMC1 to CMCx, and CMCx+1 to CMCn. The n CMCs correspond to the n battery units one to one, and each CMC is connected to a battery unit corresponding to the CMC, and is configured to monitor the corresponding battery unit, for example, to collect at least one operating parameter of the battery unit and exercise balancing control on the battery unit. The operating parameter of the battery unit may be, for example, a voltage or a temperature of a battery cell.

The n CMCs are divided into multiple CMC groups that meet preset conditions. The preset conditions are: the battery units corresponding to the CMCs in each CMC group are serially-connected to form a battery unit group corresponding to the CMC group, and the MSD switch is connected between two adjacent battery unit groups. Specifically, the CMCs corresponding to the battery units in each battery unit group form a CMC group. For example, in this embodiment, the battery units M1~Mx in the battery unit group 1 correspond to CMC1~CMCx one to one, and therefore, CMC1 CMCx form a CMC group, referred to as a CMC group 1. The battery units Mx+1~Mn in the battery unit group 2 correspond to CMCx+1~CMCn one to one, and therefore, CMCx+1~CMCn is a CMC Group, referred to as a CMC group 2. In this embodiment, the quantity of the CMC groups is one more than the quantity of the MSD switches.

In this embodiment, the rechargeable battery monitoring system includes two daisy chain buses. The two daisy chain buses correspond to two CMC groups respectively. Each CMC group is connected to the BMU through a daisy chain bus corresponding to the CMC group. When the value of n is constant, the value of x determines the quantity of battery units in each battery unit group, and determines the quantity of CMCs in each CMC group. Each CMC group connected to the BMU by a daisy chain bus suffers a line loss, and the line loss increases with the increase of length of the daisy chain bus, and the length of the daisy chain bus increases with the increase of the quantity of CMCs in each CMC group. Therefore, the quantity of CMCs in the CMC group 1 is equal to or differs by 1 from the quantity of CMCs in the CMC group 2. For example, in a case that n is an even number, if n=10, let x=5; or, in a case that n is an odd number, if n=9, let x=5. In other words, the MSD switch is disposed between the 5th battery unit and the 6th battery unit. In this way, the quantity of battery units is the same or differs by 1 between the two CMC groups, and the line loss generated by communication between the BMU and the two CMC groups is relatively equalized. In addition, preferably, each daisy chain bus in this embodiment is a differential daisy chain bus, thereby helping improve communication quality and improve robustness and electromagnetic compatibility performance.

The CMC1 and the CMCx are at a lowest potential and a highest potential in the CMC group 1 respectively, and the CMCx+1 and the CMCn are at a lowest potential and a highest potential in the CMC group 2 respectively. In this embodiment, in the CMC group 1, the lowest-potential CMC1 is directly connected to the BMU. In the CMC group 2, the highest-potential CMCn is directly connected to the BMU. This connection manner facilitates layout and installation of the battery units and wire harnesses in the battery pack, and shortens connection lines between the battery units. However, without being limited thereto, in the CMC group 1, either the CMC1 or CMCx may be directly connected to the BMU; in the CMC group 2, either the CMCx+1 or the CMCn may be directly connected to the BMU.

FIG. 1 shows an example in this embodiment, where a transformer T1 is disposed between the CMC1 and the BMU in the CMC group 1. Voltage isolation is implemented by the transformer T1, and all CMCs in the CMC group 1 are connected by sharing a common ground to implement voltage isolation between adjacent CMCs. Similarly, a transformer T2 is disposed between the CMCn and the BMU in the CMC group 2. Voltage isolation is implemented by the transformer T2, and all CMCs in the CMC group 2 are connected by sharing a common ground to implement voltage isolation between adjacent CMCs.

Preferably, the BMU may include a communication converter and a microcontroller unit ("MCU" for short). Specifically, the CMC1 in the CMC group 1 and the CMCn in the CMC group 2 are connected to the communication converter, and the communication converter is connected to the MCU. The communication converter is configured to convert data uploaded by the CMC into a communication protocol supported by the MCU, and transmit the converted data, which is uploaded by the CMC, to the MCU through a communication bus. The communication converter and the MCU are integrated together so that the communication bus between the communication converter and the MCU is as short as possible to reduce reflection and suppress electromagnetic radiation. The communication bus between the communication converter and the MCU may be one of a serial peripheral interface ("SPI" for short) bus, a universal asynchronous receiver/transmitter ("UART" for short) bus, a controller area network ("CAN" for short) bus, or an inter integrated circuit (I-squared-C, "I²C" for short) bus, but this is not limited in this embodiment.

Figure 2:
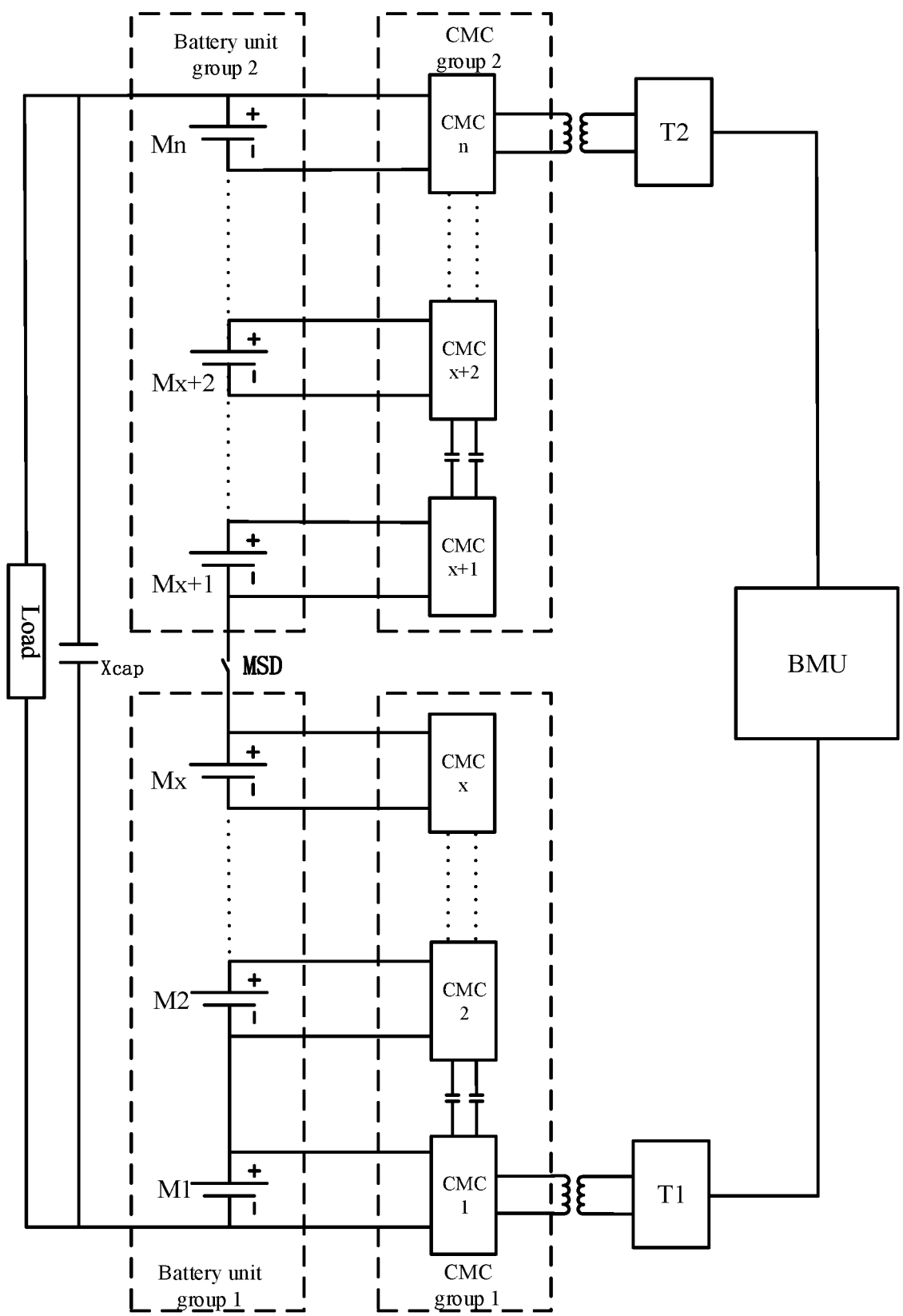
FIG. 2 is a schematic structural diagram of another example of a rechargeable battery monitoring system according to a first embodiment of this application.

FIG. 2 shows another example in this embodiment. The battery units M1~Mx in the battery unit group 1 correspond to the CMC1~CMCx in the CMC group 1 one to one. The battery units Mx+1~Mn in the battery unit group 2 correspond to the CMCx+1~CMCn in the CMC group 2 one to one. An isolation unit is disposed between adjacent CMCs in the CMC group 1, and an isolation unit is disposed between adjacent CMCs in the CMC group 2. Specifically, in each CMC group, voltage isolation between adjacent CMCs is implemented by the isolation unit. Voltage isolation is implemented between the CMC1 and the CMC2 in the CMC group 1 by the isolation unit, and voltage isolation is implemented between the CMCx+1 and the CMCx+2 in the CMC group 2 by the isolation unit. The isolation unit may also be a capacitive isolation unit, an inductive isolation unit, or an optical isolation unit. This embodiment does not limit the type of the isolation unit. In the example in FIG. 2, the isolation unit is an isolation capacitor (that is, a type of capacitive isolation unit). Moreover, in the example in FIG. 2, the isolation capacitor is disposed on a daisy chain bus. However, in other examples, the isolation unit may also be integrated inside the CMC. In addition, it is noted that an isolation unit is disposed between each CMC group and the BMU. The transformer T1 (between the CMC1 and the BMU) and the transformer T2 (between the CMCn and the BMU) shown in FIG. 2 may also be replaced by any one of a capacitive isolation unit, an inductive isolation unit, or an optical isolation unit. This is not limited in this embodiment.

In the examples shown in FIG. 1 and FIG. 2, in a case that one MSD exists, the CMCs are divided into two CMC groups. Specifically, the BMU communicates with the CMC group 1 through a daisy chain bus, and the BMU communicates with the CMC group 2 through a daisy chain bus, thereby implementing dual-chain communication.

Figure 3:
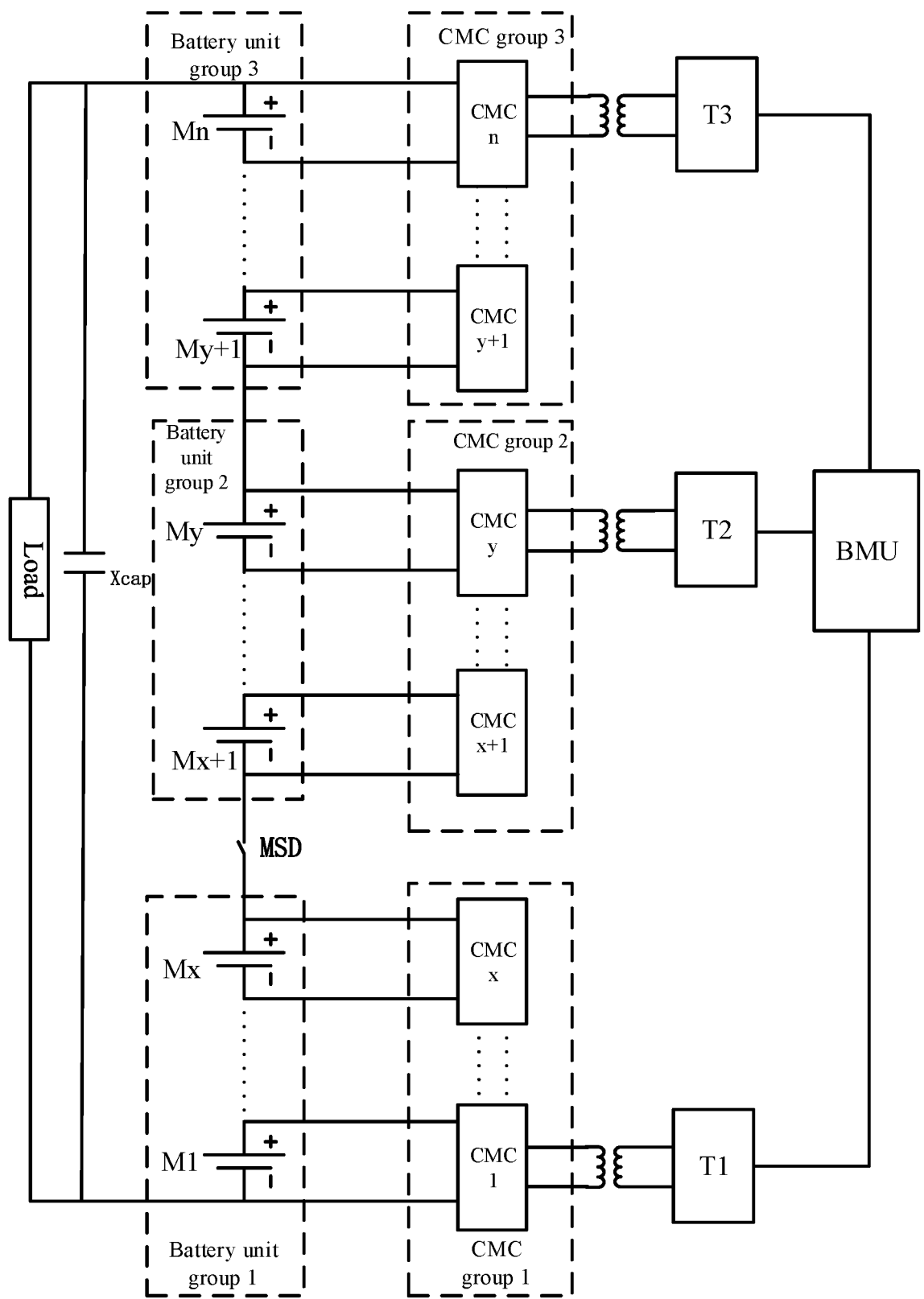
FIG. 3 is a schematic structural diagram of still another example of a rechargeable battery monitoring system according to a first embodiment of this application.

FIG. 3 shows another example in this embodiment. In the same case that one MSD switch exists, multi-chain communication is performed. The multi-chain communication means involving three or more daisy chain buses. In FIG. 3, although the MSD is disposed between the Mx and the Mx+1, the n CMCs are divided into three CMC groups. CMC1~CMCx form a CMC group 1, CMCx+1~CMCy form a CMC group 2, and CMCy+1~CMCn form a CMC group 3. The battery units connected to the CMCs one to one are also divided into three groups. M1~Mx form a battery unit group 1, Mx+1~My form a battery unit group 2, and My+1~Mn form a battery unit group 3. The three CMC groups correspond to the three daisy chain buses one to one, and each CMC group communicates with the BMU through a daisy chain bus. The CMC1 in the CMC group 1 is communicatively connected to the BMU through the transformer T1, the CMCy in the CMC group 2 is communicatively connected to the BMU through the transformer T2, and the CMCn in the CMC group 3 is communicatively connected to the BMU through the transformer T3. With the total quantity of CMCs being constant, if the quantity of the CMC groups is larger, the quantity of CMCs in each CMC group will be smaller, the daisy chain bus corresponding to each CMC group will be shorter, and the line loss will be smaller. Therefore, in a case that there are many CMCs (that is, there are many battery units), multi-chain communication may be performed to meet the need of reducing the line loss. Because other connection manners of multi-chain communication and the foregoing dual-chain communication example are similar, details are omitted here. Therefore, in other examples, in the same case that one MSD switch exists, the n CMCs may also be divided into four groups, five group, six groups, and so on. However, no matter how many groups the n CMCs are divided into, the MSD switch is necessarily connected between two battery unit groups corresponding to two adjacent CMC groups.

Referring to the examples in FIG. 1, FIG. 2, and FIG. 3, the quantity of CMC groups is at least one more than the quantity of MSD switches so as to avoid damage that may be caused to a chip on a CMC in a process of plugging or unplugging the MSD switch. Specifically, in a case that one MSD switch exists, the CMCs are divided into at least two CMC groups. In a case that two MSD switches exist, the CMCs are divided into at least three CMC groups. In a case that three MSD switches exist, the CMCs are divided into at least four CMC groups, and so on. It needs to be noted that, in this embodiment, the fact that the quantity of CMC groups is at least one more than the quantity of MSD switches so as to avoid damage that may be caused to a chip on a CMC in a process of plugging or unplugging the MSD switch is based on a prerequisite that only one MSD switch is possible for being connected between any two adjacent battery units. In a case that two or more MSD switches are serially-connected together and located between two adjacent battery units, the two or more serially-connected MSD switches may be treated as a whole MSD unit.

The following describes principles of how the embodiments of this application can avoid damage that may be caused to a chip on a CMC in a process of plugging or unplugging the MSD switch.

Figure 4:
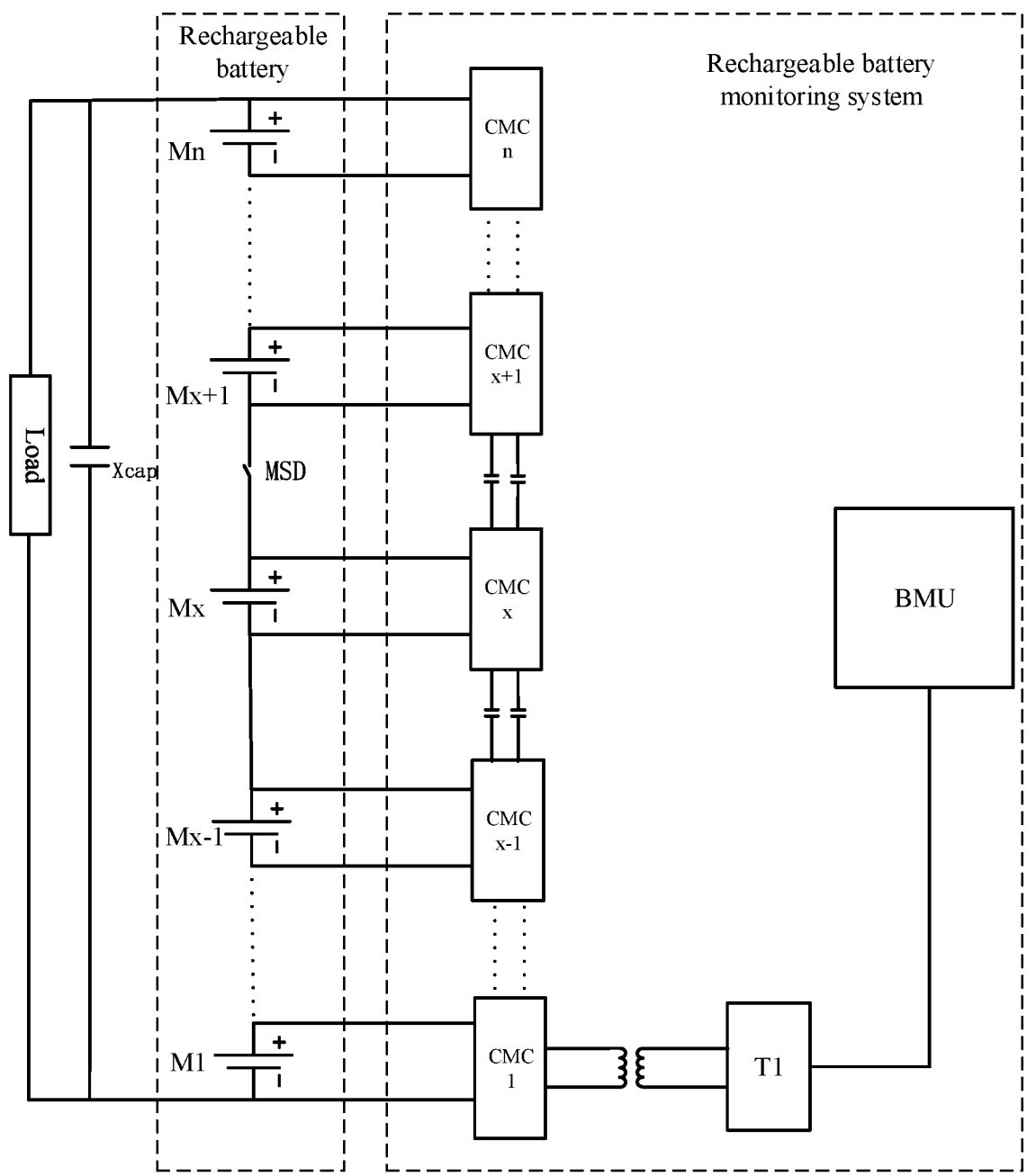
FIG. 4 is a schematic structural diagram of a rechargeable battery monitoring system in the prior art.
Figure 5:
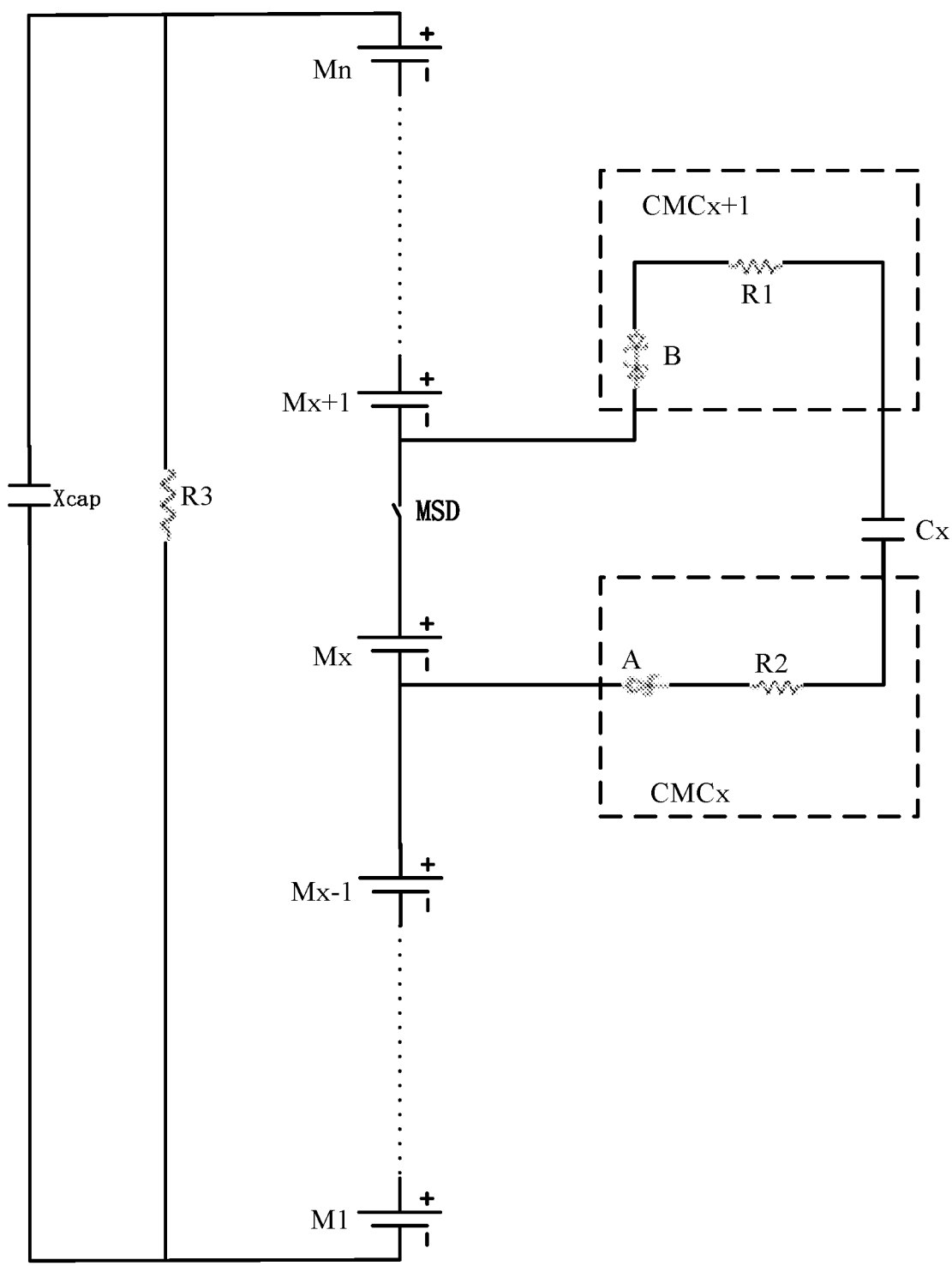
FIG. 5 is an equivalent circuit diagram of a rechargeable battery monitoring system according to FIG. 4.

FIG. 4 is a schematic structural diagram of a rechargeable battery monitoring system in the prior art. The n battery units in the rechargeable battery are connected to the n CMCs one to one. The n CMCs communicate with the BMU through a daisy chain bus, and the CMCs are isolated from each other by isolation capacitors. FIG. 5 is an equivalent circuit diagram of a rechargeable battery monitoring system according to FIG. 4.

It needs to be noted that in the prior art, generally more than one type of chip is included on each CMC, and a chip protection circuit is disposed on each chip. In this embodiment, an electrostatic discharge ("ESD" for short) protection circuit on a sampling chip is used as an example, and the protection circuit serves a function of preventing ESD from damaging the chip. In FIG. 5, the protection circuit on the CMCx includes a voltage regulator tube A and a resistor R2. The voltage regulator tube A and the resistor R2 are serially-connected. The protection circuit on the CMCx+1 are a voltage regulator tube B and a resistor R1. The voltage regulator tube B and the resistor R1 are serially-connected. A pin of the protection circuit on the CMCx is connected to a negative electrode of the Mx. A pin of the protection circuit on the CMCx+1 is connected to a negative electrode of the Mx+1 (that is, a positive electrode of the Mx). Xcap represents an equivalent capacitance of the battery pack or an entire vehicle system, and R3 represents an equivalent insulation resistance of the rechargeable battery. The rechargeable battery is disposed in the battery pack.

Assuming that the voltage of each battery unit is V1=40, n=10, then the voltage of the entire rechargeable battery is Vpack=10 V1. Assuming R1+R2=1.55 K, a total breakdown voltage VF of A and B generally does not exceed 36 V.

Assuming that the voltage Vx on the Xcap is zero before the MSD switch is plugged (in a case of not plugging or unplugging continuously), then the voltage between points A and B is −9 V1. At a moment of plugging the MSD switch, the voltage between points A and B changes from −9 V1 to V1, that is, an amount of change in the voltage between points A and B is 10 V1, resulting in a surge voltage between points A and B. Isolation capacitors Cx between the MSD switch, Mx, CMCx, CMCx+1, CMCx, and CMCx+1 form a discharge circuit. If the surge voltage between points A and B exceeds a tolerance capability of this discharge circuit, the discharge circuit will be broken down. If a breakdown current brought by the surge voltage is too large, the chips in CMCx and CMCx+1 will be damaged.

A formula for calculating a current I passing through the discharge circuit may be: I=(10 V1−Vx−VF)/(R1+R2). Therefore, when the voltage Vx on the Xcap is zero, I=(10 V1−VF)/(R1+R2)=(400−36)/1550 Ω≈0.2 A. In practical applications, an overcurrent capability of a daisy-chain communication circuit generally withstands only a current of no more than 0.05 A. A high-frequency current of 0.2 A will break down the chips on CMCx and CMCx+1 and damage the chips. If the voltage Vx on the Xcap is not zero before the MSD switch is plugged (for example, in a case of plugging and unplugging the MSD switch continuously, electricity charged on the Xcap due to previous plugging of the MSD switch has not been discharged), the current I passing through the discharge circuit can also be calculated according to the above formula.

Before the MSD switch is unplugged, that is, when the monitoring system is in a normal working state, the voltage between points A and B is V1. At the moment of unplugging the MSD switch, the voltage between points A and B changes from V1 to −9 V1. That is, the amount of change in the voltage between points A and B is 10 V1. However, after the MSD switch is unplugged, Mx is disconnected from Mx+1. Therefore, CMCx, Cx, CMCx+1, Mx+1~Mn, Xcap, and M1~Mx−1 here form a discharge circuit, and the discharge circuit formed at the moment of unplugging the MSD switch is different from the discharge circuit formed at the moment of plugging the MSD switch. In the discharge circuit formed at the moment of unplugging the MSD switch, CMCx, CMCx+1, Cx, and Xcap are in the same discharge circuit, but the Xcap greatly alleviates generation of an instantaneous extremely high current in the discharge circuit. Therefore, in a discharging process, although the Cx may also be broken down by a breakdown current, the breakdown current generated at the moment of unplugging the MSD switch will be much smaller than the breakdown current generated at the moment of plugging the MSD switch due to the Xcap. Therefore, the chip on the CMCx and the chip on the CMCx+1 may be undamaged or unlikely to be damaged.

As can be seen from the above analysis, in the prior art, the chips on the CMCx and the CMCx+1 may be damaged by the process of plugging or unplugging MSD because the CMCx and the CMCx+1 are in the discharge circuit with a surge voltage in the process of plugging or unplugging the MSD switch. When a discharge current formed in a discharge process is much larger than a tolerance range of the overcurrent capability of the daisy chain communication circuit, the chips on the CMCx and the CMCx+1 will be damaged. The possibility of damaging the chips may be higher at the moment of plugging the MSD switch than at the moment of unplugging the MSD switch.

In this embodiment of this application, the CMCx belongs to the CMC group 1, the CMC x+1 belongs to the CMC group 2, and the CMC group 1 and the CMC group 2 are connected to the BMU through different daisy chain buses. That is, the CMCx is disconnected from the CMCx+1 and no communication path exists between them. Therefore, the above discharge circuit is unlikely to be formed at the moment of plugging or unplugging the MSD switch. Therefore, despite the surge voltage, no discharge circuit is formed, thereby avoiding damage that may be caused to the chips on the CMCx and the CMC x+1 in a process of plugging or unplugging the MSD switch.

A second embodiment of this application relates to a rechargeable battery monitoring system. The second embodiment makes improvements based on the first embodiment. Main improvements are: in the second embodiment of this application, a battery unit group connected to the MSD switch is referred to as a first battery unit group, a CMC group corresponding to the first battery unit group is referred to as a first CMC group, and a CMC corresponding to a battery unit connected to the MSD switch in the first battery unit group is referred to as a first CMC. In the first CMC group, voltage isolation is implemented between the first CMC and a CMC adjacent thereto through an isolation transformer.

Figure 6:
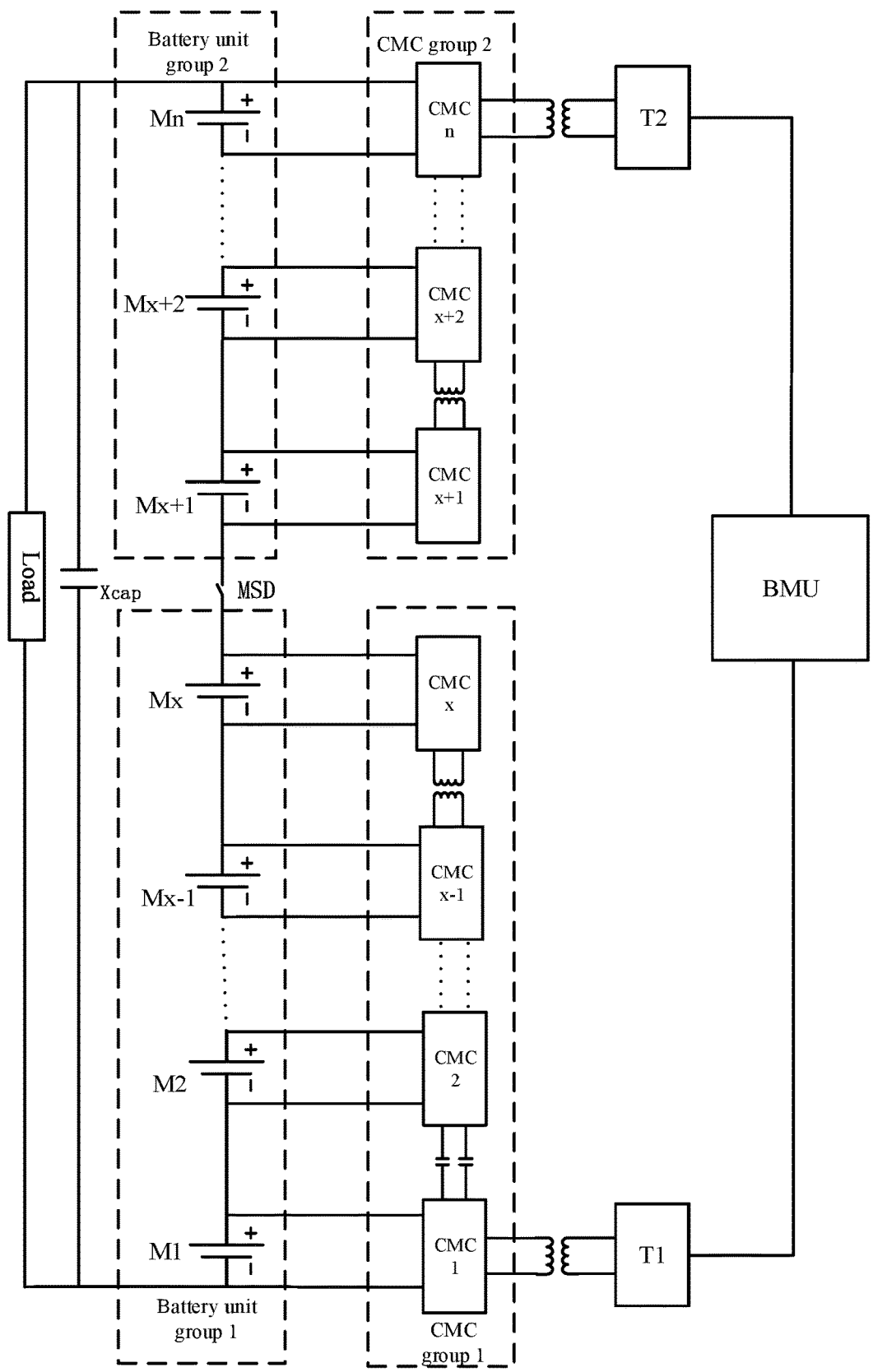
FIG. 6 is a schematic structural diagram of a rechargeable battery monitoring system according to a second embodiment of this application.

FIG. 6 is a schematic structural diagram of a rechargeable battery monitoring system according to this embodiment. FIG. 6 is an improvement made on the basis of FIG. 2.

In FIG. 6, the battery unit group connected to the MSD switch is referred to as a first battery unit group, and the CMC group corresponding to the first battery unit group is referred to as a first CMC group. Specifically, as shown in FIG. 6, the MSD switch divides n battery units into a battery unit group 1 and a battery unit group 2, and the MSD switch is connected between the battery unit group 1 and the battery unit group 2. Therefore, the first battery unit group includes a battery unit group 1 and a battery unit group 2; and the first CMC group includes a CMC group 1 corresponding to the battery unit group 1 and a CMC group 2 corresponding to the battery unit group 2.

The CMC corresponding to the battery unit connected to the MSD switch in the first battery unit group is referred to as a first CMC. Specifically, the battery unit Mx in the battery unit group 1 is connected to the MSD switch, and the battery unit Mx+1 in the battery unit group 2 is connected to the MSD switch. That is, the first CMC includes the CMCx corresponding to Mx and the CMCx+1 corresponding to Mx+1.

In the first CMC group, voltage isolation is implemented between the first CMC and a CMC adjacent thereto by an isolation transformer. Specifically, CMCx is adjacent to CMCx−1, and CMCx+1 is adjacent to CMCx+2. Correspondingly, voltage isolation is implemented between CMCx and CMCx−1 by an isolation transformer, and voltage isolation is implemented between CMCx+1 and CMCx+2 by an isolation transformer.

In this embodiment, an isolation transformer is disposed between the first CMC and the adjacent CMC. Due to better isolation effects and better ESD prevention performance of the isolation transformer, communication signals in daisy chain communication are better.

A third embodiment of this application relates to a rechargeable battery monitoring system. The third embodiment is roughly the same as the second embodiment, and main improvements are: in the third embodiment of this application, in each CMC group, voltage isolation is implemented between two adjacent CMCs by an isolation transformer.

Figure 7:
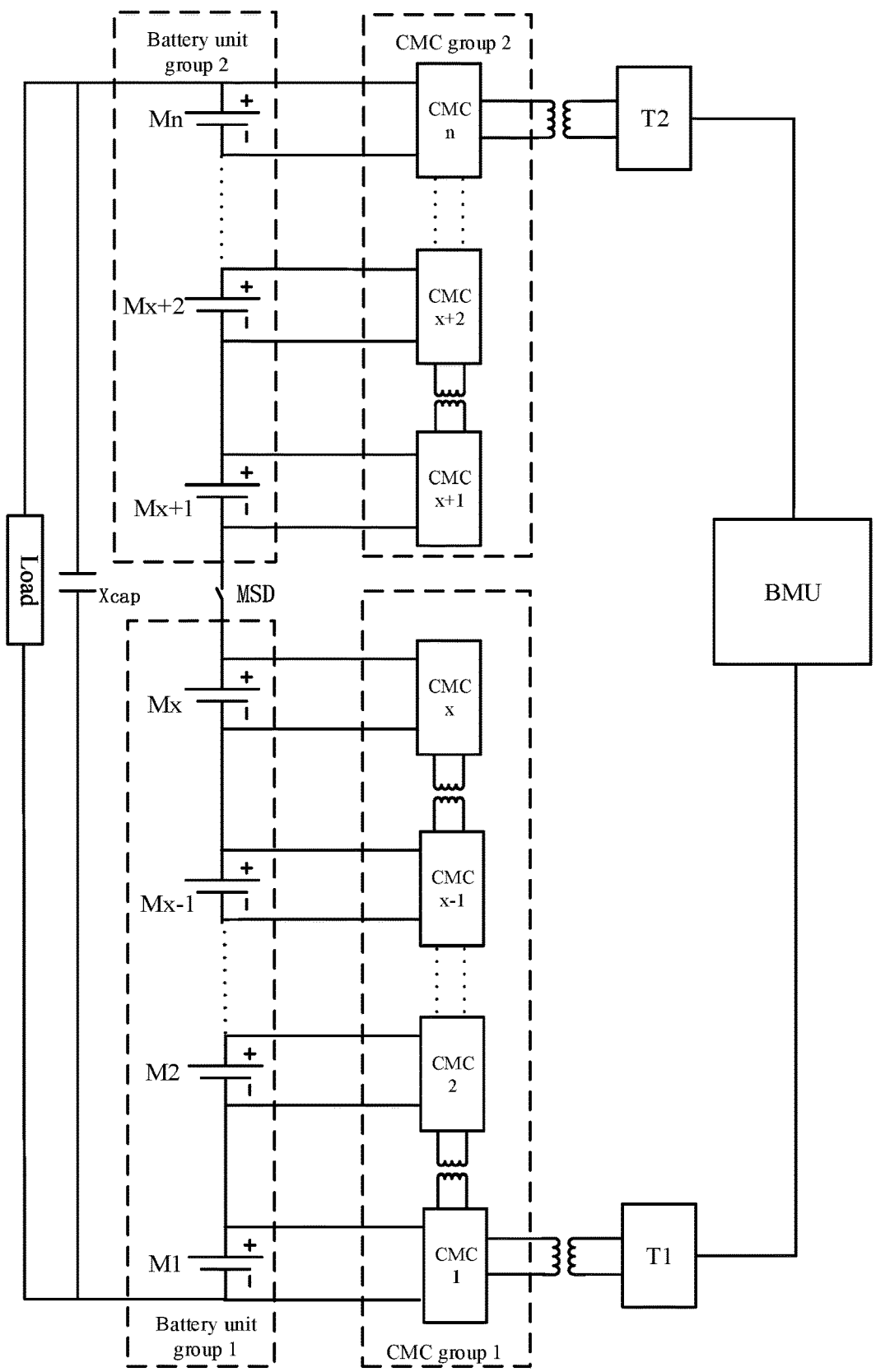
FIG. 7 is a schematic structural diagram of a rechargeable battery monitoring system according to a third embodiment of this application.

FIG. 7 is a schematic structural diagram of a rechargeable battery monitoring system according to this embodiment. In FIG. 7, in the CMC group 1 and the CMC group 2, voltage isolation is implemented between any two adjacent CMCs by an isolation transformer. Specifically, CMC1 is adjacent to CMC2, CMCx is adjacent to CMCx−1, and CMCx+1 is adjacent to CMCx+2. Correspondingly, voltage isolation is implemented between CMC1 and CMC2 by an isolation transformer, voltage isolation is implemented between CMCx and CMCx−1 by an isolation transformer, and voltage isolation is implemented between CMCx+1 and CMCx+2 by an isolation transformer.

In addition, it needs to be noted that this embodiment may also be an improvement made on the basis of the first embodiment.

In this embodiment, an isolation transformer is disposed between any two adjacent CMCs to implement voltage isolation, so as to maximally increase isolation performance and ESD prevention performance and improve communication signals in daisy chain communication.

Figure 8:
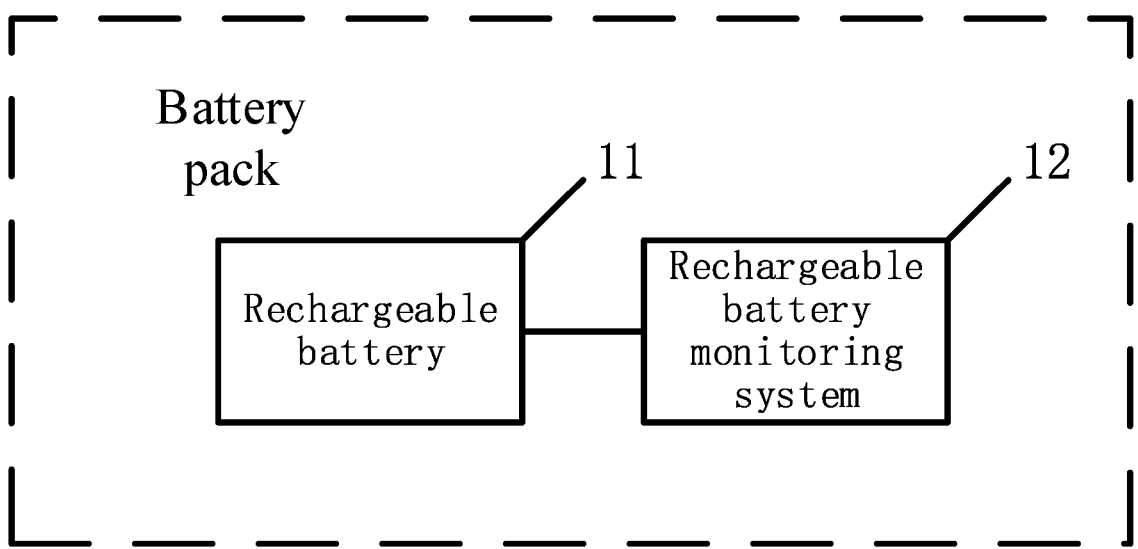
FIG. 8 is a schematic block diagram of a battery pack according to a fourth embodiment of this application.

A fourth embodiment of this application relates to a battery pack. As shown to FIG. 8, the battery pack includes a rechargeable battery 11 and the rechargeable battery monitoring system 12 described in any of the first to third embodiments.

Apparently, this embodiment is an apparatus embodiment corresponding to the first to third embodiments, and this embodiment may be implemented in collaboration with the first to third embodiments. Relevant technical details mentioned in the first to third embodiments are still applicable to this embodiment. For brevity, details are omitted here. Correspondingly, relevant technical details mentioned in this embodiment are also applicable to any of the first to third embodiments.

A fifth embodiment of this application relates to an electric vehicle, including the battery pack according to the fourth embodiment.

Apparently, this embodiment is an apparatus embodiment corresponding to the fourth embodiment, and this embodiment may be implemented in collaboration with the fourth embodiment. Relevant technical details mentioned in the fourth embodiment are still applicable to this embodiment. For brevity, details are omitted here. Correspondingly, the relevant technical details mentioned in this embodiment are also applicable in the fourth embodiment.

It needs to be noted that all modules referred to in this embodiment are logical modules. In practical applications, a logical unit may be a physical unit or a part of a physical unit, or a combination of a plurality of physical units. In addition, to highlight an innovation part of this application, this embodiment does not describe units that are not closely related to solving the technical issues put forward in this application, which, however, shall not mean that no other units exist in this embodiment.

A person of ordinary skill in the art understands that the embodiments described above are exemplary embodiments for implementing this application. In practical applications, various modifications may be made in form and detail to the embodiments without departing from the spirit and scope of this application.

What is claimed is:

1. A rechargeable battery monitoring system, comprising:
a plurality of battery units and at least one manual service disconnect (MSD) switch, wherein the plurality of battery units are serially-connected and the MSD switch is connected between two adjacent ones of the plurality of battery units;
a battery management unit (BMU) and a plurality of battery cell monitoring circuits (CMCs), wherein a quantity of the plurality of CMCs is equal to a quantity of the plurality of battery units, each CMC being connected to a corresponding battery unit; and
multiple daisy chain buses, wherein the plurality of CMCs are divided into multiple CMC groups that meet preset conditions, and each CMC group is communicatively connected to the BMU through respective one and only one of the multiple daisy chain buses and has no connection relationship with other CMC groups, wherein:
the preset conditions are: the battery units corresponding to the CMCs in each CMC group are serially-connected to form a battery unit group corresponding to the CMC group, and the MSD switch is connected between two adjacent battery unit groups; and, wherein
two adjacent CMCs in each CMC group are isolated from each other by an isolation unit,
a transformer is disposed between each of the plurality of CMCs and the BMU to implement voltage isolation between adjacent CMSs.

2. The rechargeable battery monitoring system according to claim 1, wherein a quantity of the CMC groups is one more than a quantity of the MSD switches.

3. The rechargeable battery monitoring system according to claim 2, wherein the plurality of CMCs are divided into two CMC groups.

4. The rechargeable battery monitoring system according to claim 1, wherein a battery unit group connected to the MSD switch is referred to as a first battery unit group, a CMC group corresponding to the first battery unit group is referred to as a first CMC group, and a CMC corresponding to a battery unit connected to the MSD switch in the first battery unit group is referred to as a first CMC; and
in the first CMC group, an isolation unit between the first CMC and a CMC adjacent thereto is a first transformer.

5. The rechargeable battery monitoring system according to claim 3, wherein a quantity of CMCs is the same or differs by 1 between the two CMC groups.

6. The rechargeable battery monitoring system according to claim 3, wherein a lowest-potential CMC in one of the two CMC groups is directly connected to the BMU, and a highest-potential CMC in the other of the two CMC groups is directly connected to the BMU.

7. The rechargeable battery monitoring system according to claim 1, wherein the isolation unit selected from a capacitive isolation unit, an inductive isolation unit, and an optical isolation unit.

8. The rechargeable battery monitoring system according to claim 1, wherein the plurality of CMCs are divided into at least three CMC groups.

9. A battery pack, comprising a rechargeable battery and a rechargeable battery monitoring system coupled to the rechargeable battery, wherein the rechargeable battery monitoring system comprises:
a plurality of battery units and at least one manual service disconnect (MSD) switch, wherein the plurality of battery units are serially-connected and the MSD switch is connected between two adjacent ones of the plurality of battery units;
a battery management unit (BMU) and a plurality of battery cell monitoring circuits (CMCs), wherein a quantity of the plurality of CMCs is equal to a quantity of the plurality of battery units, each CMC being connected to a corresponding battery unit; and
multiple daisy chain buses, wherein the plurality of CMCs are divided into multiple CMC groups that meet preset conditions, and each CMC group is communicatively connected to the BMU through respective one and only one of the multiple daisy chain buses and has no connection relationship with no connection relationship with other CMC groups, wherein:
the preset conditions are: the battery units corresponding to the CMCs in each CMC group are serially-connected to form a battery unit group corresponding to the CMC group, and the MSD switch is connected between two adjacent battery unit groups and, wherein
two adjacent CMCs in each CMC group are isolated from each other by an isolation unit,
a transformer is disposed between each of the plurality of CMCs and the BMU to implement voltage isolation between adjacent CMSs.

10. The battery pack according to claim 9, wherein a quantity of the CMC groups is one more than a quantity of the MSD switches.

11. The battery pack according to claim 10, wherein the plurality of CMCs are divided into two CMC groups.

12. The battery pack according to claim 10, wherein a battery unit group connected to the MSD switch is referred to as a first battery unit group, a CMC group corresponding to the first battery unit group is referred to as a first CMC group, and a CMC corresponding to a battery unit connected to the MSD switch in the first battery unit group is referred to as a first CMC; and
in the first CMC group, an isolation unit between the first CMC and a CMC adjacent thereto is a first transformer.

13. The battery pack according to claim 11, wherein a quantity of CMCs is the same or differs by 1 between the two CMC groups.

14. The battery pack according to claim 11, wherein a lowest-potential CMC in one of the two CMC groups is directly connected to the BMU, and a highest-potential CMC in the other of the two CMC groups is directly connected to the BMU.

15. The battery pack according to claim 9, wherein the isolation unit selected from a capacitive isolation unit, an inductive isolation unit, and an optical isolation unit.

16. The battery pack according to claim 9, wherein the plurality of CMCs are divided into at least three CMC groups.

17. An electric vehicle, comprising a battery pack, wherein the battery pack comprises: a rechargeable battery and a rechargeable battery monitoring system coupled to the rechargeable battery, and the rechargeable battery monitoring system comprises:
- a plurality of battery units and at least one manual service disconnect (MSD) switch, wherein the plurality of battery units are serially-connected and the MSD switch is connected between two adjacent ones of the plurality of battery units;
- a battery management unit (BMU) and a plurality of battery cell monitoring circuits (CMCs), wherein a quantity of the plurality of CMCs is equal to a quantity of the plurality of battery units, each CMC being connected to a corresponding battery unit; and
- multiple daisy chain buses, wherein the plurality of CMCs are divided into multiple CMC groups that meet preset conditions, and each CMC group is communicatively connected to the BMU through respective one and only one of the multiple daisy chain buses and has no connection relationship with other CMC groups, wherein:
the preset conditions are: the battery units corresponding to the CMCs in each CMC group are serially-connected to form a battery unit group corresponding to the CMC group, and the MSD switch is connected between two adjacent battery unit groups; and, wherein
two adjacent CMCs in each CMC group are isolated from each other by an isolation unit,
a transformer is disposed between each of the plurality of CMCs and the BMU to implement voltage isolation between adjacent CMSs.

18. The electric vehicle according to claim 17, wherein the isolation unit selected from a capacitive isolation unit, an inductive isolation unit, and an optical isolation unit.

19. The electric vehicle according to claim 17, wherein the plurality of CMCs are divided into at least three CMC groups.

* * * * *